(12) United States Patent
Rowe et al.

(10) Patent No.: US 7,064,641 B2
(45) Date of Patent: Jun. 20, 2006

(54) CATHEDRAL DOOR SHUTTER ASSEMBLY

(75) Inventors: Neal Edward Rowe, Asheville, NC (US); Michael Howard Abrahamsen, Hendersonville, NC (US); Stanley Ervin Moore, Weaverville, NC (US); Timothy Fair, Boiling Springs, SC (US); Marlyce Jean Scott, Hendersonville, NC (US)

(73) Assignee: Eaton Corporation, Cleveland, OH (US)

( * ) Notice: Subject to any disclaimer, the term of this patent is extended or adjusted under 35 U.S.C. 154(b) by 225 days.

(21) Appl. No.: 10/848,296

(22) Filed: May 18, 2004

(65) Prior Publication Data

US 2005/0258922 A1 Nov. 24, 2005

(51) Int. Cl.
*H01H 33/50* (2006.01)
*H01H 9/00* (2006.01)
*H01H 9/22* (2006.01)
*H02B 1/14* (2006.01)

(52) U.S. Cl. .................. 335/202; 361/617; 200/50.22
(58) Field of Classification Search ............... 361/607, 361/609, 615–617, 634–636, 640, 652; 200/50.21, 200/50.22; 335/202
See application file for complete search history.

(56) References Cited

U.S. PATENT DOCUMENTS

| | | | | |
|---|---|---|---|---|
| 2,894,085 A | * | 7/1959 | Wilson | 200/50.22 |
| 3,121,144 A | * | 2/1964 | Tjebben | 200/50.22 |
| 3,610,850 A | * | 10/1971 | Eichelberger | 200/50.21 |
| 3,778,568 A | * | 12/1973 | Wilson | 200/50.22 |
| 3,920,939 A | * | 11/1975 | Ciboldi et al. | 200/50.22 |
| 4,038,585 A | * | 7/1977 | Wolski et al. | 361/624 |
| 4,086,452 A | * | 4/1978 | Collins | 200/50.22 |
| 4,146,915 A | * | 3/1979 | Yosida | 361/617 |
| 4,183,073 A | * | 1/1980 | Clausing | 361/617 |
| 4,285,026 A | * | 8/1981 | Clausing | 361/617 |
| 4,386,246 A | * | 5/1983 | Castonguay | 200/50.22 |
| 4,417,108 A | * | 11/1983 | Vaill et al. | 200/50.22 |
| 4,468,531 A | * | 8/1984 | Postlethwait et al. | 200/50.22 |
| 4,486,815 A | * | 12/1984 | Takahashi | 361/617 |

(Continued)

*Primary Examiner*—Ramon M. Barrera
(74) *Attorney, Agent, or Firm*—Martin J. Moran

(57) ABSTRACT

A shutter assembly for a shuttered bus assembly is provided. The shuttered bus assembly is coupled to a circuit breaker housing assembly. The circuit breaker housing assembly is structured to enclose a circuit breaker assembly. The circuit breaker assembly is structured to move generally horizontally in and out of the circuit breaker housing assembly. The circuit breaker assembly has a plurality of finger connectors extending generally horizontally from the back side of the circuit breaker assembly. The shuttered bus assembly has at least one pair of conductors which extend toward the front of said housing assembly. The finger connectors are structured to engage the conductors. The shutter assembly includes a mounting assembly and a door panel. The mounting assembly is structured to be coupled to the housing assembly. The door panel has at least one opening and at least one door member, the door panel extends across the housing assembly and is disposed between the plurality of conductors and the circuit breaker assembly when the circuit breaker assembly is out of the housing assembly, the door panel is further coupled to the mounting assembly. The at least one door member is disposed in the at least one opening and is coupled to the door panel by a hinge. The door member is structured to move between a first closed position and a second open position. The door member is structured to be moved to the second position by the finger connectors as the circuit breaker assembly is moved into the housing assembly.

38 Claims, 5 Drawing Sheets

U.S. PATENT DOCUMENTS

| | | | |
|---|---|---|---|
| 4,565,908 A * | 1/1986 | Bould | 200/50.22 |
| 5,327,321 A * | 7/1994 | Rosen | 361/617 |
| 5,343,355 A * | 8/1994 | Ishikawa | 361/617 |
| 5,486,978 A * | 1/1996 | Fishovitz | 361/617 |
| 5,505,630 A | 4/1996 | Petrisko et al. | |
| 5,550,707 A * | 8/1996 | Iversen | 361/617 |
| 5,734,547 A * | 3/1998 | Iversen | 361/617 |
| 6,414,839 B1 * | 7/2002 | Derksen | 361/617 |

\* cited by examiner

CATHEDRAL DOOR SHUTTER ASSEMBLY

BACKGROUND OF THE INVENTION

1. Field of the Invention

The present invention relates to circuit breakers, and in particular to a draw-out circuit breaker mounted in a housing assembly and, more specifically, to a housing assembly having a bus assembly mounted therein and a cathedral door shutter assembly structured to block access to the bus assembly when the circuit breaker is removed from the housing assembly.

2. Background Information

Low voltage circuit breakers used in electric power distribution systems are commonly mounted in a housing assembly and supported on rollers which permits easy installation and removal of the sizeable circuit breakers required for such service. The housing assembly has walls forming an enclosure and a bus assembly. The bus assembly includes line and load conductors for each pole of the circuit breaker. Each line conductor, or "riser," is, essentially, an elongated conductive bar with the longitudinal axis extending vertically through the housing assembly and the lateral axis extending toward the front of the housing assembly. The line conductors, or "runback," are elongated conductive bars extending from the back of the housing assembly toward the front of the housing assembly and are interspersed, and offset, with the line conductors. The conductor bars are structured to be engaged by finger connectors on the back of the circuit breaker as the circuit breaker is moved into the housing assembly. In order to protect personnel from the exposed power system terminations when the circuit breaker is removed, shutter assemblies have been developed which automatically close over the conductors as the circuit breaker is withdrawn from the housing assembly, and which are opened by inward movement of the circuit breaker during installation.

The prior art shutter assembly typically included a first, stationary plate having a series of openings therein, a second, movable plate having solid portions and openings, a spring assembly and a linkage. The openings in the first, stationary plate were aligned with the bus assembly risers. The second, movable plate was slidably coupled to the first plate. In a first position, the second plate solid portions covered the first plate openings. In a second position, the second plate openings aligned with the first plate openings, thereby allowing the circuit breaker finger connectors to pass therethrough. The spring assembly biased the second plate into the first position. The linkage acted upon the second plate to overcome the bias of the spring assembly and to move the second plate into the second position. The linkage was actuated by the circuit breaker being moved into the housing assembly. The linkage and the spring assembly were typically made from metal and made from multiple parts. It is not desirable to have metal parts disposed adjacent to the circuit breaker fingers and conductors. Further, it is not desirable to have overly complex mechanisms for performing the simple operation of opening and closing the shutter assembly. Additionally, because the shutter door assembly included space for the shutter to slide laterally, the shutter assembly has a lateral width that may not fit within enclosures for smaller circuit breakers.

There is, therefore, a need for a shutter assembly that does not include sliding shutter doors.

There is a further need for a shutter assembly that does not include metal parts or has a reduced number of metal parts.

There is a further need for a shutter assembly that utilizes a reduced number of moving parts.

SUMMARY OF THE INVENTION

These needs, and others, are met by the present invention which provides a non-metallic shutter assembly. The shutter assembly has cathedral doors, i.e., a pivoting door that is, preferably bifurcated. In one embodiment, the door members coupled to a door panel by living hinges. The door panel includes at least one opening with a door member disposed in the opening. In a preferred embodiment, each opening is coupled to a door assembly having two door members, each door member extending about half way across the opening. The two door members are coupled to the door panel by living hinges located on opposite edges of the opening. The door members are engaged by the circuit breaker finger assemblies as the circuit breaker is moved into the housing assembly. Both the door panel and the door members are made from a non-conductive, non-metal material.

In another embodiment, the door members include a snap-fit hinge structure. That is, the door members are separate from the door panel and have a pivot rod on one vertical side. The pivot rod has rounded protrusions at either end. The door panel includes pivot rod supports one the vertical sides of each door opening. The pivot rod supports include a detent structured to engage the pivot rod protrusion.

Typically, the circuit breaker will have three poles and six finger assemblies. That is, two finger assemblies, line and load, per pole. Preferably, the door panel will have three openings, one per pole. Where the line and load conductors are offset from each other, there is a separate door panel for the line conductors and the load conductors. The openings have a sufficient length to allow the line and/or load fingers for one pole to pass therethrough. The door members are also coupled to a closing device that includes a rod and a return spring. The rod and return spring are made from rigid, yet resilient, non-conductive material. In one embodiment, the spring is a U-shaped member coupled between the door panel and the rod. In a second embodiment, the rod and the door panel each include a retaining post. A spring extends between the door panel retaining post and the rod retaining post. In either embodiment, the spring is structured to act on the rod so that the rod closes the door members.

In operation, each door member moves between a first, closed position and a second, open position. The door members are disposed between the conductors and the front of the enclosure. Each door member is coupled to the closing device which biases the door member to the first, closed position. Thus, when the circuit breaker is out of the housing assembly, the door members are in the first, closed position. As a circuit breaker is moved into the housing assembly, the finger connectors engage the door members and move the door members to the second, open position. As the door members are opened, the flexibility of the return spring allows the rod to move along the generally arcuate path the doors travel. When the circuit breaker is removed from the housing assembly, the finger connectors disengage from the door members and the closing device moves the door members to the first position.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
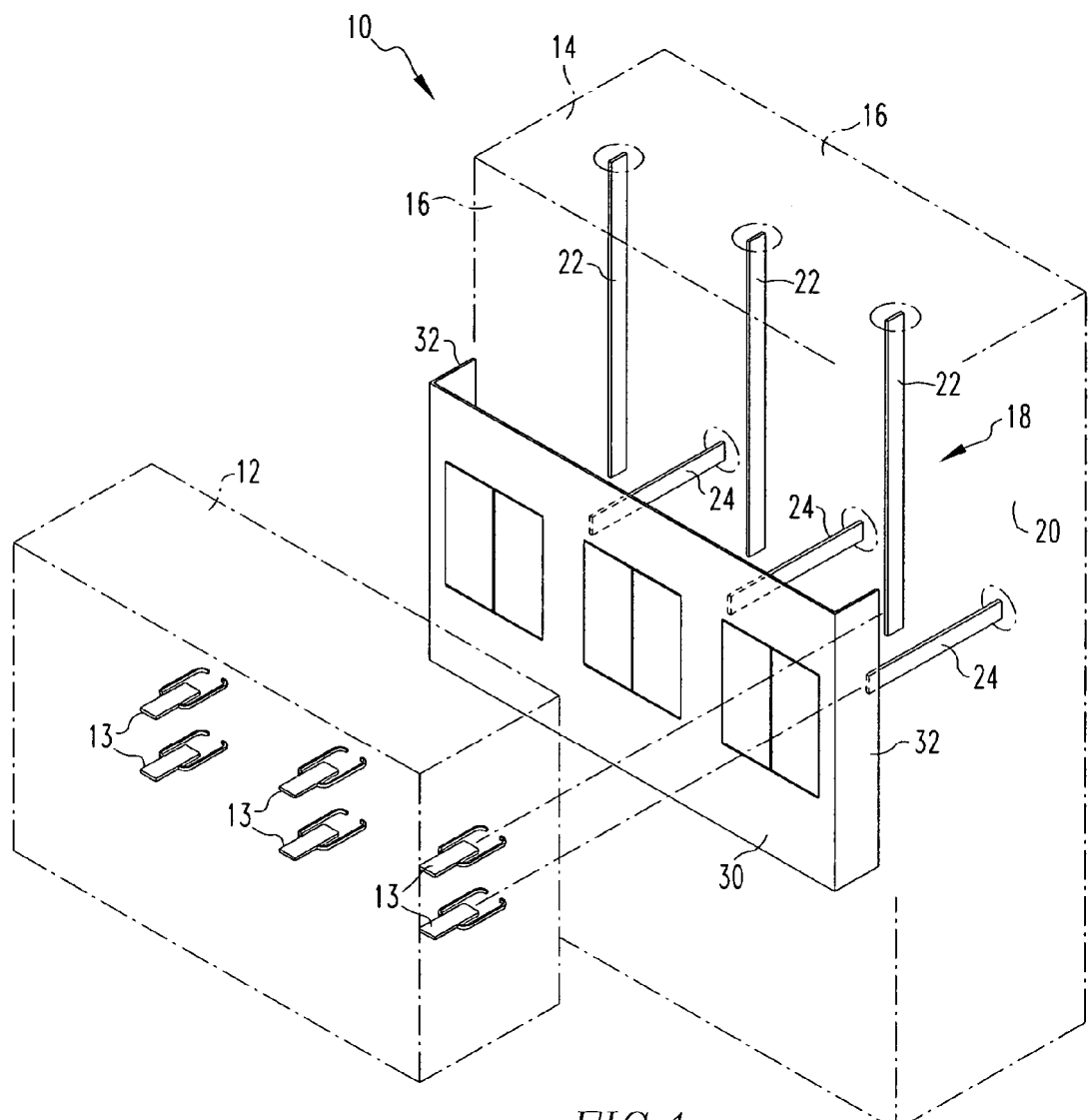
FIG. 1 is a schematic isometric view of a circuit breaker installation.

As shown in FIG. 1, a circuit breaker installation 10 includes a circuit breaker assembly 12 and a housing assembly 14. The circuit breaker assembly 12 is, preferably, a low voltage circuit breaker as is known in the art. The circuit breaker assembly 12 includes a plurality of finger connectors 13 extending from the back side of the circuit breaker assembly 12 and structured to engage the bus assembly conductors 22, 24 described below. The housing assembly 14 includes a plurality of wall members 16 and a shuttered bus assembly 18. The wall members 16 form an enclosure having a back wall 20 and a housing door (not shown). The shuttered bus assembly 18 includes a bus assembly 21 and shutter assembly 30. The bus assembly 21 is coupled to the back wall 20 and includes at least one line conductor 22 and at least one load conductor 24. Typically, there is one line conductor 22 and one load conductor 24 for each pole of the circuit breaker assembly 12. As shown in Figures, the circuit breaker assembly 12 is a three pole circuit breaker. However, it is understood that the present invention may be practiced with a circuit breaker having any number of poles. The following description shall be addressed to a single pole of the circuit breaker, however, it is understood that the circuit breaker has similar structures associated with each pole. The line conductor 22 is an elongated conductive bar with the longitudinal axis extending vertically through the housing assembly 14 and the lateral axis extending toward the front of the housing assembly 14. The line conductor 24 is elongated conductive bar extending from the back of the housing assembly 14 toward the front of the housing assembly 14. The line and load conductors 22, 24 are, typically, interspersed and offset, with each other. The shutter assembly 30 is disposed between the conductors 22, 24 and the front of the housing assembly 14. Where the line and load conductors 22, 24 are offset with each other, there are two shutter assemblies 30, one associated with the line conductors 22 and one associated with the load conductors 24.

Figure 2:
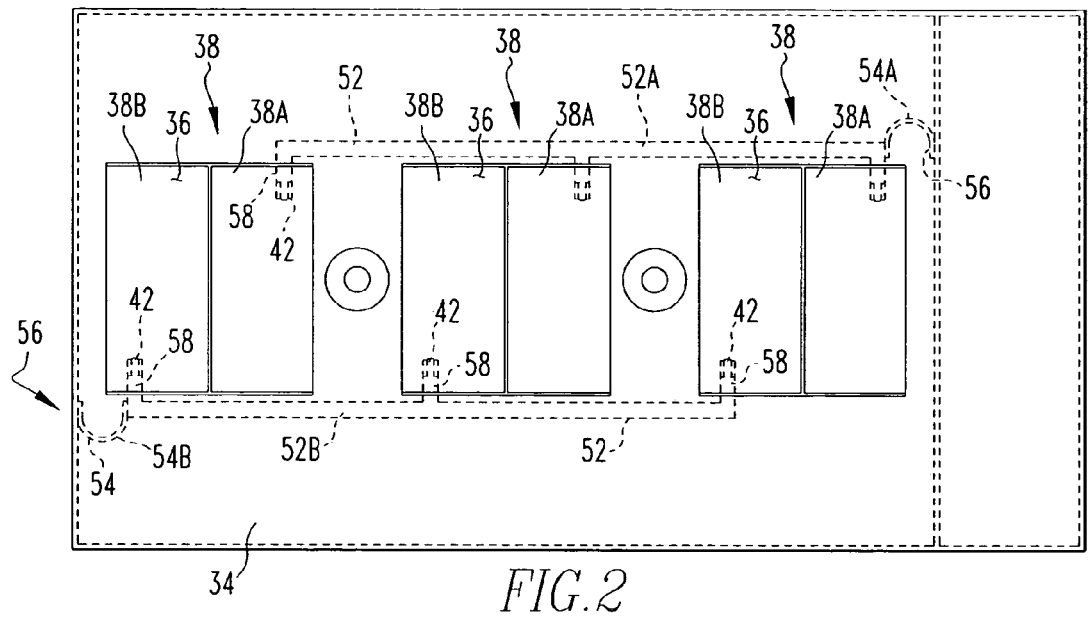
FIG. 2 is a front view of the shutter assembly.
Figure 3:
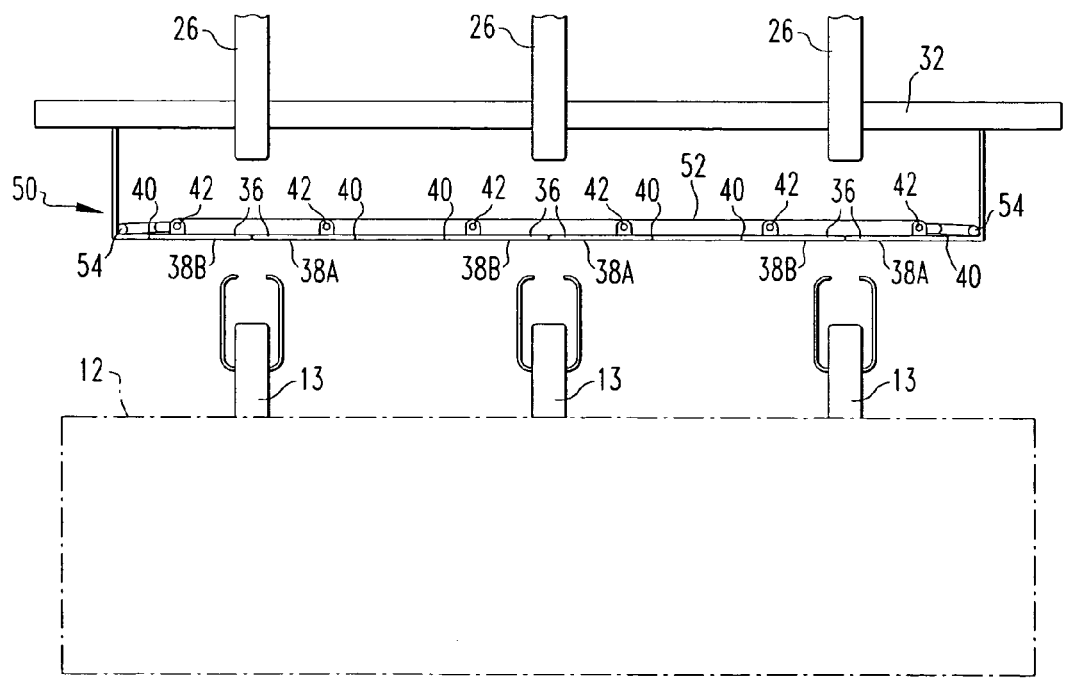
FIG. 3 is a top view of the shutter assembly.
Figure 4:
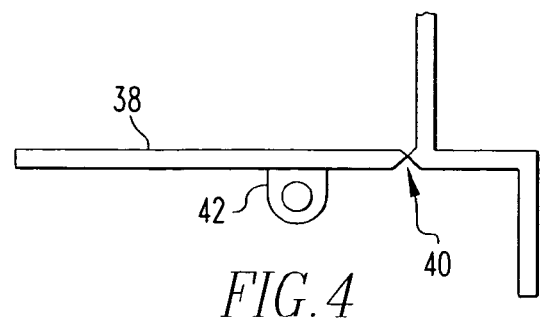
FIG. 4 is a detailed view of a door member and a living hinge.
Figure 5A:
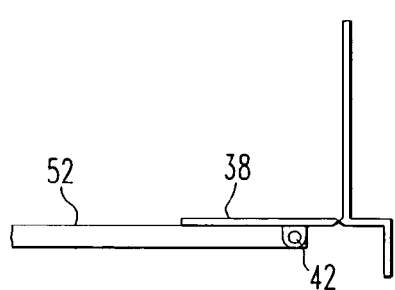
FIGS. 5A–5D are top views of a door member as it moves from the first, closed position, FIG. 5A, to the second, open position, FIG. 5D, showing two intermediate stages, FIGS. 5B and 5C.
Figure 5B:
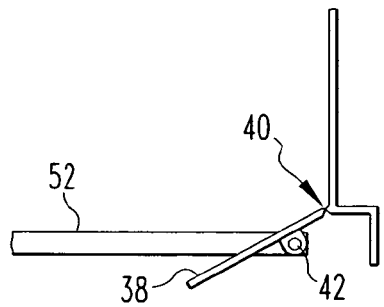
Figure 5C:
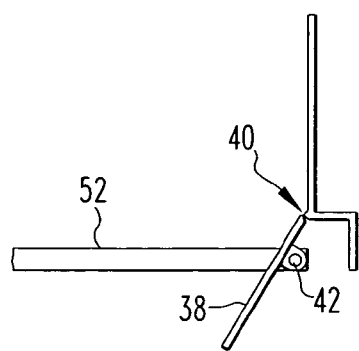
Figure 5D:
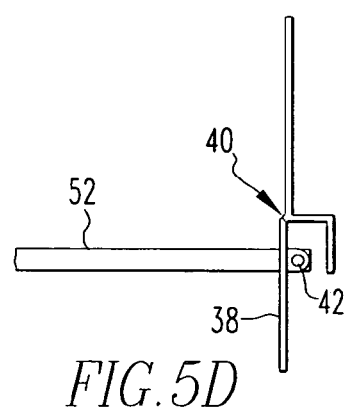

As shown in FIGS. 2 and 3, a first embodiment of the shutter assembly 30 includes a mounting assembly 32, a door panel 34, at least one opening 36, at least one door member 38 disposed in each opening 36, and a closing device 50. The mounting assembly 32 is coupled to the housing assembly wall members 16 or back wall 20. The mounting assembly 32 is structured to hold the door panel 34 in a location between the bus assembly 21 and the front of the housing assembly 14. The mounting assembly 32 is made from a non-conductive material. The door panel 34 is a planar member made from a non-conductive material. The door panel 34 has one opening 36 for each pole of the circuit breaker assembly 12. Each opening 36 is sized so that the opening 36 is disposed over either a line and load conductor 22, 24 for a single pole of the circuit breaker assembly 12. A door member 38 is a non-conductive planar member disposed in each opening 36 and coupled to the door panel 34 by a living hinge 40, as shown in FIG. 4. Each door member 38 has a boss 42 disposed on one side, preferably the side closest to the bus assembly 21. The boss 42 is structured to engage the rod connector 58 of the closing device 50, described below. The boss 42 is preferably disposed adjacent to the living hinge 40 of each door member 38. Preferably, the door panel 34 and the door members 38 are formed from a sheet of the same material and wherein the door members 38 are cut along three edges thereby forming the openings 36.

In a preferred embodiment, each opening 36 is covered by bifurcated door members 38A, 38B. That is, instead of a single door member 38 disposed in each opening 36 and extending across the entire opening 36, there are two door members, a first and second door member 38A, 38B, each extending across about one half of the opening 36. As shown in the Figures, the door members 38A, 38B, have generally vertical living hinges 40A, 40B disposed on opposite lateral sides of the openings 36.

The closing device 50 includes at least one elongated rod 52 and at least one return spring 54. The rod 52 and return spring 54 are made from a non-conductive material. The return spring 54 is, preferably, a U-shaped member 56. The return spring 54 is, preferably, coupled to the door panel 34 at an outer edge. The rod 52 extends between the return spring 54 and the door members 38. When the living hinge 40 extends generally vertically, the rod 52 extends generally horizontally. A rod connector 58 extends generally perpendicular to the rod 52 adjacent to each door member 38. The rod connector 58 is structured to be coupled to the boss 42 on each door member 38. As shown in FIGS. 5A–5D, the return spring 54 is sufficiently flexible to allow the rod 52 to shift laterally and move forward and backward in the housing assembly 14. That is, the return spring 54 preferably may twist as well as flex linearly along a single axis.

In the preferred embodiment with bifurcated door members 38A, 38B, there is an upper rod 52A and a lower rod 52B. Each of the upper and lower rods 52A, 52B is coupled to a return spring, a first return spring 54A and a second return spring 54B, respectively. The upper rod 52A extends along the upper edge of the openings 36 and is coupled to each first door member 38A. The lower rod 52B extends along the bottom edge of the openings 36 and is coupled to each second door member 38B. The first return spring 54A coupled to the upper rod 52A is coupled to one side of the door panel 34 and the second return spring 54B coupled to the lower rod 52B is coupled to the opposite side of the door panel 34. In this configuration, the upper and lower rods 52A, 52B are biased in opposite directions. As shown in the Figures, where the circuit breaker has multiple poles, a single upper rod 52A or lower rod 52B may extend to each first door member 38A or second door member 38B.

When assembled, the shuttered bus assembly 18 is disposed in the housing assembly 14. The bus assembly 21 is coupled to the of the housing assembly 14 with the conductors 22, 24 extending toward the front of the housing assembly 14. The mounting assembly 32 is coupled to one or more wall members 16 or, preferably, to the back wall 20. When coupled to the back wall 20, the mounting assembly 32 has a sufficient rise off the back wall 20 to extend beyond the conductors 22, 24. The door panel 34 is coupled to the mounting assembly 32 and extends laterally in front of the conductors 22, 24. Each conductor 22, 24 associated with a pole of the circuit breaker assembly 12 is aligned with an opening 36 in the door panel 34. The first and second door members 38A, 38B are disposed in each opening 36 and are structured to move between a first, closed position and a second, open position. In the first, closed position, the door members 38A, 38B act to block access to a conductor 22, 24. In the second, open position, the door members 38A, 38B are moved to a side and the conductors 22, 24 may be accessed.

The upper rod 52A is coupled to each first door member 38A as well as the first return spring 54A. The upper rod 52A and first return spring 54A biases each first door member 38A to the first position. The lower rod 52B is coupled to each second door member 38B as well as the second return spring 54B. The lower rod 52B and second return spring 54B biases each second door member 38B to the first, closed position.

When the circuit breaker assembly 12 is out of the housing assembly 14, the door members 38A, 38B are in the first, closed position. As the circuit breaker assembly 12 is moved into the housing assembly 14, the finger connectors 13 engage the door members 38A, 38B and move the door members 38A, 38B to the second, open position. As the door members 38A, 38B are opened, the flexibility of the return spring 54A, 54B allows each rod 52A, 52B to move along the generally arcuate path the door members 38A, 38B travel. When the circuit breaker assembly 12 is removed from the housing assembly 14, the finger connectors 13 disengage from the door members 38A, 38B and the closing device 50 moves the door members 38A, 38B to the first position.

Figure 6:
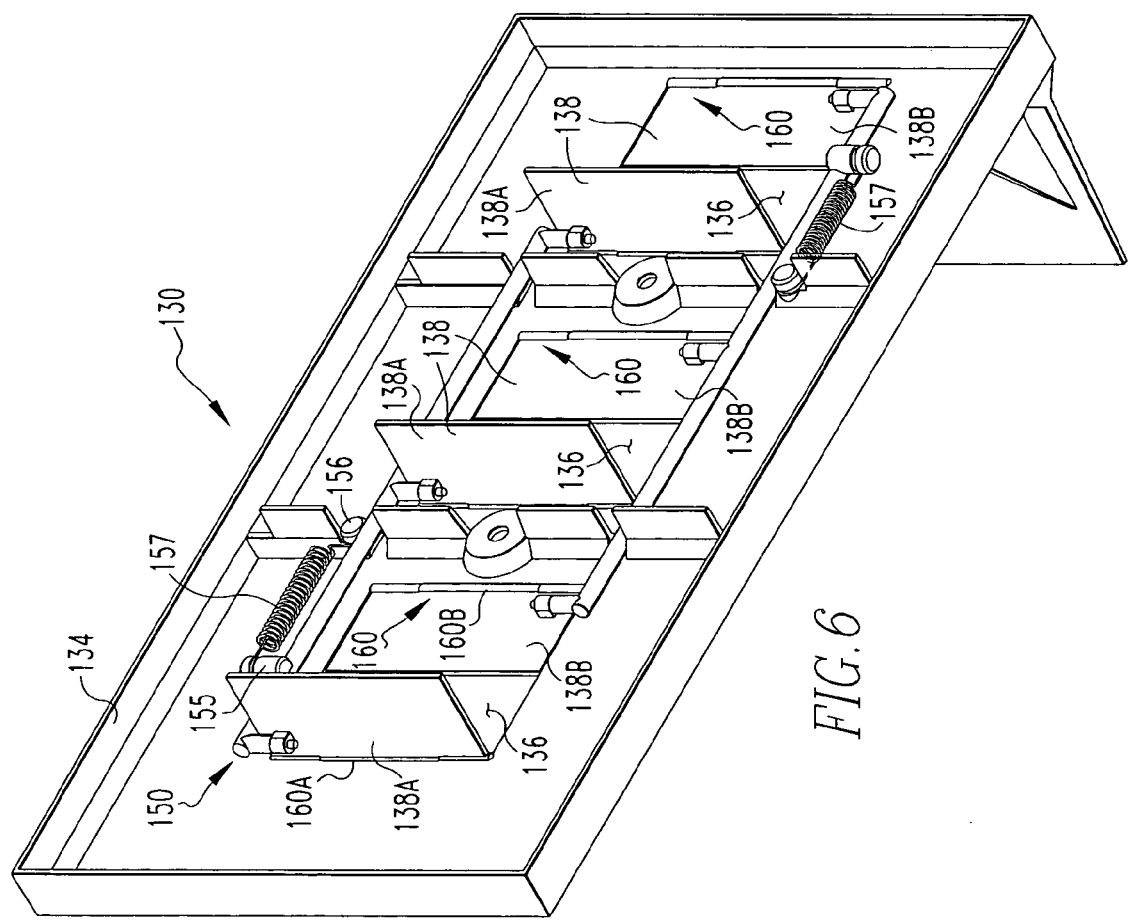
FIG. 6 is a back isometric view of an alternate embodiment of the shutter assembly.

A second embodiment of the shutter assembly 130 is shown in FIG. 6. Because this embodiment of the invention is substantially similar to the prior embodiment, except for the snap fit hinge 160, the reference numbers for like components shall be maintained except increased by 100. Thus, in this embodiment, the shutter assembly 130 includes a door panel 134, at least one opening 136, at least one door member 138 disposed in each opening 136, and a closing device 150. In this embodiment of the shutter assembly 130 the door panel 134 is coupled to a mounting assembly 32 in a manner substantially similar to the prior embodiment. The door panel 134 is a planar member made from a non-conductive material. The door panel 134 has one opening 136 for each pole of the circuit breaker assembly 12. Each opening 136 is sized so that the opening 136 is disposed over either a line or a load conductors 22, 24 for a single pole of the circuit breaker assembly 12. A door member 138 is a non-conductive planar member disposed in each opening 136 and coupled to the door panel 134 by a snap fit hinge 160.

Figure 7:
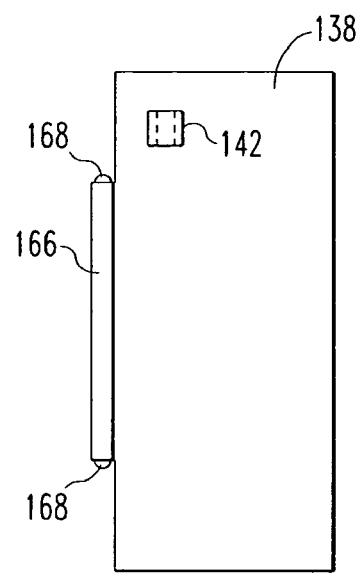
FIG. 7 is a front view of a door member of the alternate embodiment of the shutter assembly.
Figure 8:
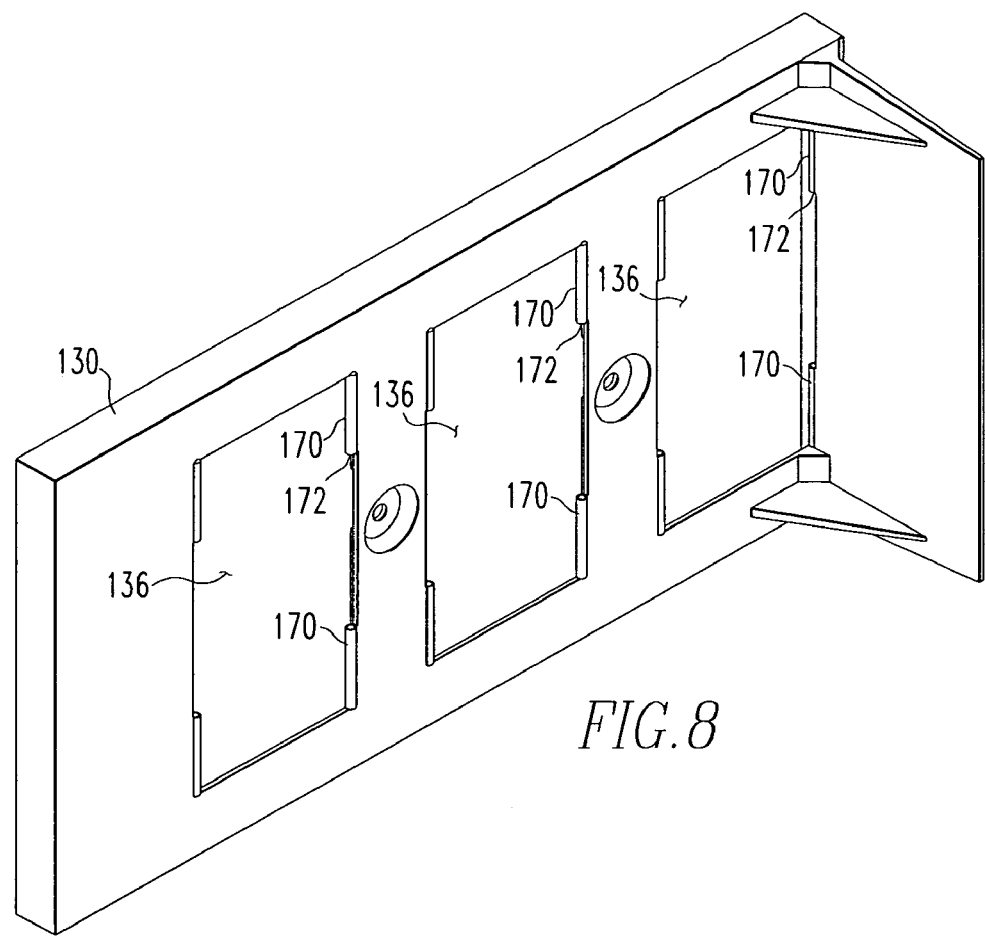
FIG. 8 is a front isometric view of door panel of the alternate embodiment of the shutter assembly.

The snap fit hinge 160 has two components a protrusion 162 and a detent 164, as shown on FIGS. 7 and 8. FIG. 7 shows a door member 138 having a hinge rod 166 disposed on one vertical edge. At each end of the hinge rod 166 is a rounded protrusion 168. FIG. 8 shows the door panel 134 having a bifurcated hinge support rod 170. On each interior end of the bifurcated hinge support rod 170 is a detent 172 structured to engage the hinge rod protrusion 168. The gap between the portions of the bifurcated hinge support rod 170 is sized to fit the hinge rod 166. Thus, the snap fit hinge 160 components may be joined to form the hinge.

As before, each door member 138 has a boss 142 disposed on one side, preferably the side closest to the bus assembly 21. The boss 142 is structured to engage the rod connector 158 of the closing device 150, described below. The boss 142 is preferably disposed adjacent to the snap fit hinge 160 of each door member 138.

In a preferred form of this embodiment, each opening 136 is covered by bifurcated door members 138A, 138B. That is, instead of a single door member 138 disposed in each opening 136 and extending across the entire opening 136, there are two door members, a first and second door member 138A, 138B, each extending across about one half of the opening 136. As shown in FIG. 6, the door members 138A, 138B, have generally snap fit hinges 160A, 160B disposed on opposite lateral sides of the openings 136.

The closing device 150 includes at least one elongated rod 152 and at least one return spring 154. The rod 152 and the door panel 134 each include a spring retaining post 155 and 156, respectively. A return tension spring 157 is coupled to the two retaining posts 155, 156. The rod 152 further extends between the door members 138. When the snap fit hinges 160A, 160B extend generally vertically, the rod 152 extends generally horizontally. A rod connector 158 extends generally perpendicular to the rod 152 adjacent to each door member 138. The rod connector 158 is structured to be coupled to the boss 142 on each door member 138. In other aspects, including the manner of operation, this embodiment of the shutter assembly 130 is substantially similar to the prior embodiment. Accordingly, it is understood that this embodiment of the shutter assembly 130 may be practiced in a manner similar to that described above.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A shutter assembly for a shuttered bus assembly that is coupled to a circuit breaker housing assembly, said circuit breaker housing assembly structured to engage a circuit breaker assembly, said circuit breaker assembly structured to move generally horizontally in and out of said circuit breaker housing assembly, said circuit breaker assembly further having a plurality of finger connectors extending generally horizontally from the back side of said circuit breaker assembly, said shuttered bus assembly having at least one pair of conductors which extend toward the front of said housing assembly, said finger connectors structured to engage said conductors, said shutter assembly comprising:

a mounting assembly structured to be coupled to said housing assembly;

a door panel having at least one opening and at least one door member, said door panel extending across said housing assembly and disposed between said plurality of conductors and said circuit breaker assembly when said circuit breaker assembly is out of said housing assembly, said door panel further coupled to said mounting assembly; and said at least one door member disposed in said at least one opening and coupled to said door panel by a hinge, said door member structured to move between a first closed position and a second open position and which is structured to be moved to said second position by said finger connectors as said circuit breaker assembly is moved into said housing assembly.

2. The shutter assembly of claim 1, further comprising:
a closing device having at least one return spring and at least one elongated rod;
said at least one rod coupled to both said at least one door member and said at least one return spring; and
whereby said at least one return spring biases said at least one door member to said first, closed position.

3. The shutter assembly of claim 2, wherein said hinge on said at least one door member extends generally vertically.

4. The shutter assembly of claim 2, wherein:
said door panel includes two door members disposed in each opening, a first door member and a second door member;
said closing device includes an upper rod, a lower rod, a first return spring and a second return spring;
said upper rod coupled to, and extending between, said first return spring and said first door member;
said lower rod coupled to, and extending between, said second return spring and said second door member, wherein each door member is biased in the closed position.

5. The shutter assembly of claim 4, wherein said door panel includes three openings, each opening having a first and second door member disposed therein.

6. The shutter assembly of claim 5, wherein
each hinge extends generally vertically; and
each opening is aligned with a bus assembly conductor.

7. The shutter assembly of claim 6, wherein said return spring is a U-shaped resilient member.

8. The shutter assembly of claim 6, wherein:
said return spring is a tension spring;
said door panel includes a retaining post;
each said rod includes a retaining post; and
said tension spring extending between door panel retaining post and the rod retaining post.

9. The shutter assembly of claim 7, wherein said mounting assembly, said door panel, said door members and said closing device are made from a non-conductive material.

10. The shutter assembly of claim 1 wherein said mounting assembly, said door panel, said door members and said closing device are made from a non-conductive material.

11. The shutter assembly of claim 9, wherein said hinge is a living hinge.

12. The shutter assembly of claim 9, wherein said hinge is a snap-fit hinge.

13. A shuttered bus assembly for a circuit breaker housing assembly, said circuit breaker housing assembly structured to enclose a circuit breaker assembly, said circuit breaker assembly structured to move generally horizontally in and out of said circuit breaker housing assembly, said circuit breaker assembly further having a plurality of finger connectors extending generally horizontally from the back side of said circuit breaker assembly, said shuttered bus assembly comprising:
a bus assembly having one or more pairs of line and load conductors which extend toward the front of said housing assembly and which are structured to be engaged by said finger connectors, said bus assembly couple to said housing assembly;
said shutter assembly comprising:
a mounting assembly structured to be coupled to said housing assembly;
a door panel having at least one opening and at least one door member, said door panel extending across said housing assembly and disposed between said plurality of conductors and said circuit breaker assembly when said circuit breaker assembly is out of said housing assembly, said door panel further coupled to said mounting assembly; and
said at least one door member disposed in said at least one opening and coupled to said door panel by a hinge, said door member structured to move between a first closed position and a second open position and which is structured to be moved to said second position by said finger connectors as said circuit breaker assembly is moved into said housing assembly.

14. The shuttered bus assembly of claim 13, further comprising:
a closing device having at least one return spring and at least one elongated rod;
said at least one rod coupled to both said at least one door member and said at least one return spring; and
whereby said at least one return spring biases said at least one door member to said first, closed position.

15. The shuttered bus assembly of claim 14, wherein said hinge on said at least one door member extends generally vertically.

16. The shuttered bus assembly of claim 14, wherein:
said door panel includes two door members disposed in each opening, a first door member and a second door member;
said closing device includes an upper rod, a lower rod, a first return spring and a second return spring;
said upper rod coupled to, and extending between, said first return spring and said first door member;
said lower rod coupled to, and extending between, said second return spring and said second door member, wherein each door member is biased in the closed position.

17. The shuttered bus assembly of claim 16, wherein said door panel includes three openings, each opening having a first and second door member disposed therein.

18. The shuttered bus assembly of claim 17, wherein
each hinge extends generally vertically; and
each opening is aligned with a bus assembly conductor.

19. The shuttered bus assembly of claim 18, wherein said return spring is a U-shaped resilient member.

20. The shuttered bus assembly of claim 18, wherein:
said return spring is a tension spring;
said door panel includes a retaining post;
each said rod includes a retaining post; and
said tension spring extending between door panel retaining post and the rod retaining post.

21. The shuttered bus assembly of claim 19, wherein said mounting assembly, said door panel, said door members and said closing device are made from a non-conductive material.

22. The shuttered bus assembly of claim 13 wherein said mounting assembly, said door panel, said door members and said closing device are made from a non-conductive material.

23. The shuttered bus assembly of claim 22, wherein:
said door panel includes two door members disposed in each opening, a first door member and a second door member;
said closing device includes an upper rod, a lower rod, a first return spring and a second return spring;
said upper rod coupled to, and extending between, said first return spring and said first door member;
said lower rod coupled to, and extending between, said second return spring and said second door member, wherein each door member is biased in the closed position.

24. The shuttered bus assembly of claim 13, wherein said hinge is a living hinge.

25. The shuttered bus assembly of claim 13, wherein said hinge is a snap-fit hinge.

26. A circuit breaker installation comprising:
a housing assembly having a plurality of wall members forming a housing assembly;
a circuit breaker assembly having a plurality of finger connectors extending generally horizontally from the back side of said circuit breaker assembly and which is structured to move generally horizontally in and out of said circuit breaker housing assembly;
a shuttered bus assembly coupled to said housing assembly and comprising:
one or more pairs of line and load conductors which extend toward the front of said housing assembly and which are structured to be engaged by said finger connectors;
said shutter assembly comprising:
a mounting assembly structured to be coupled to said housing assembly;
a door panel having at least one opening and at least one door member, said door panel extending across said housing assembly and disposed between said plurality of conductors and said circuit breaker assembly when said circuit breaker assembly is out of said housing assembly, said door panel further coupled to said mounting assembly; and
said at least one door member disposed in said at least one opening and coupled to said door panel by a hinge, said door member structured to move between a first closed position and a second open position and which is structured to be moved to said second position by said finger connectors as said circuit breaker assembly is moved into said housing assembly.

27. The circuit breaker installation of claim 26, further comprising:
a closing device having at least one return spring and at least one elongated rod;
said at least one rod coupled to both said at least one door member and said at least one return spring; and
whereby said at least one return spring biases said at least one door member to said first, closed position.

28. The circuit breaker installation of claim 27, wherein said hinge on said at least one door member extends generally vertically.

29. The circuit breaker installation of claim 27, wherein:
said door panel includes two door members disposed in each opening, a first door member and a second door member;
said closing device includes an upper rod, a lower rod, a first return spring and a second return spring;
said upper rod coupled to, and extending between, said first return spring and said first door member;
said lower rod coupled to, and extending between, said second return spring and said second door member, wherein each door member is biased in the closed position.

30. The circuit breaker installation of claim 29, wherein said door panel includes three openings, each opening having a first and second door member disposed therein.

31. The circuit breaker installation of claim 30, wherein each hinge extends generally vertically; and
each opening is aligned with a bus assembly conductor.

32. The circuit breaker installation of claim 31, wherein said return spring is a U-shaped resilient member.

33. The circuit breaker installation of claim 31, wherein:
said return spring is a tension spring;
said door panel includes a retaining post;
each said rod includes a retaining post; and
said tension spring extending between door panel retaining post and the rod retaining post.

34. The circuit breaker installation of claim 31, wherein said mounting assembly, said door panel, said door members and said closing device are made from a non-conductive material.

35. The circuit breaker installation of claim 26 wherein said mounting assembly, said door panel, said door members and said closing device are made from a non-conductive material.

36. The circuit breaker installation of claim 35, wherein:
said door panel includes two door members disposed in each opening, a first door member and a second door member;
said closing device includes an upper rod, a lower rod, a first return spring and a second return spring;
said upper rod coupled to, and extending between, said first return spring and said first door member;
said lower rod coupled to, and extending between, said second return spring and said second door member, wherein each door member is biased in the closed position.

37. The shuttered bus assembly of claim 26, wherein said hinge is a living hinge.

38. The shuttered bus assembly of claim 26, wherein said hinge is a snap-fit hinge.

* * * * *